(12) United States Patent
Furukawa

(10) Patent No.: US 8,495,362 B2
(45) Date of Patent: Jul. 23, 2013

(54) SIGNATURE SYSTEMS

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 13/055,798

(22) PCT Filed: Jul. 28, 2009

(86) PCT No.: PCT/JP2009/063401
§ 371 (c)(1),
(2), (4) Date: Jan. 25, 2011

(87) PCT Pub. No.: WO2010/013699
PCT Pub. Date: Feb. 4, 2010

(65) Prior Publication Data
US 2011/0179269 A1    Jul. 21, 2011

(30) Foreign Application Priority Data

Jul. 28, 2008    (JP) .................................. 2008-193402

(51) Int. Cl.
*H04L 29/06*    (2006.01)
(52) U.S. Cl.
USPC ......................................................... 713/156
(58) Field of Classification Search
USPC ......................................................... 713/156
See application file for complete search history.

(56) References Cited

U.S. PATENT DOCUMENTS 6,154,841 A * 11/2000 Oishi ............................ 713/180
7,571,324 B2 * 8/2009 Canard et al. ................. 713/180
8,078,876 B2 * 12/2011 Brickell et al. ............... 713/176

FOREIGN PATENT DOCUMENTS

| JP | 2000134192 A | 5/2000 |
| JP | 2002501218 A | 1/2002 |
| JP | 2002215027 A | 7/2002 |
| JP | 2002314522 A | 10/2002 |
| JP | 2008098933 A | 4/2008 |
| JP | 2008131058 A | 6/2008 |

OTHER PUBLICATIONS

International Search Report for PCT/JP2009/063401 mailed Oct. 27, 2009.

(Continued)

*Primary Examiner* — Jason Gee

(57) ABSTRACT

A signature system includes a public key certificate obtainment device 100, a public key certificate issuance device 200, and a signature device 300. The public key certificate obtainment device 100 inputs item data and an infrastructure public key that includes an item key that is an element corresponding to each item of the item data and outputs both a public key certificate that includes item data and a secret key using the data that have been input and data supplied from the public key certificate issuance device. The public key certificate issuance device 200 inputs an infrastructure public key that includes the item key that is the element corresponding to each item of the item data and outputs a proof used to identify a signer using the data that have been input and the data supplied from the public key certificate obtainment device. The signature device 300 inputs a message, a revelation item set that represents items to be revealed, the secret key and the public key certificate that the public key certificate obtainment device 100 has output and outputs a selectively anonymous signature corresponding to the message and revelation item data that are item data that belong to the revelation item set using the data that have been input.

7 Claims, 9 Drawing Sheets

OTHER PUBLICATIONS

D. Boneh et al., "Short Group Signatures" Advances in Cryptology, CRYPTO 2004, Lecture Notes in Computer Science 3152, 2004, pp. 41-55.

J. Furukawa et al., "An Efficient Group Signature Scheme from Bilinear Maps", IECE Transactions on Fundamentals of Electronics Communications and Computer Sciences, vol. E89-A, No. 5, May 2006, pp. 1328-1338.

X. Hu et al., "A novel proxy key generation protocol and its application". Computer Standards & Interfaces, vol. 29, 2007, pp. 191-195.

K. Umeda et al., "A privacy-enhanced efficient roup signature scheme", Technical Report of IEICE, vol. 103, No. 196, Jul. 2003, pp. 1-8.

J. Zhang, "On the Security of a Certificate-Based Signature Scheme and Its Improvement with Pairings", ISPEC '09 Proceedings of the 5th International Conference on Information Security Practice and Experience, LNCS, vol. 5451. Apr. 30, 2009, pp. 47-58.

* cited by examiner

SIGNATURE SYSTEMS

The present application is the National Phase of PCT/JP2009/063401, filed Jul. 28, 2009, which claims priority based on Japanese Patent Application JP 2008-193402 filed on Jul. 28, 2008, the entire contents of which being incorporated herein by reference in its entirety.

TECHNICAL FIELD

The present invention relates to signature systems, in particular, to techniques preferably used for selectively anonymous signature systems that allow a user who has a public key certificate to generate his or her own signature in such a manner that he or she only reveals desired item(s) of the public key certificate including the case in which he or she hides all items thereof, generate a signature, and verify it and that allow an authorized person to identify a signer from the signature.

BACKGROUND ART

As a group signature using a bilinear map, a group signature described in Non-patent Document 1 can be exemplified. The group signature disclosed in Non-patent Document 1 will be described with reference to FIG. 1.

Group secret key 1007 is assumed to be an element $\gamma$ of a field $Z/pZ$ selected at random where p is any prime number.

Group public key 1001 is assumed to be composed of:
the prime number p,
a character string that describes:
group 1, group 2, and group T whose order is p;
a bilinear map e from group 1 and group 2 to group T;
a homomorphism map $\phi$ from group 2 to group 1; and
a hash function Hash that maps a character string to the field $(Z/pZ)$,
a generator $G_2$ of group 2,
a generator $G_1$ of group 1 where $\phi(G_2)=G_1$,
an element 11 of group 1 selected at random, and $$W=[\gamma]G_2.$$

In this case, W is a point $\gamma$ times $G_2$.

Secret key for tracing 1018 is assumed to be composed of two points on the field $Z/pZ$ selected at random, $\zeta_1$ and $\zeta_2$.

Public key for tracing 1002 is assumed to be composed of two points on group 2 where $[\xi_1]U=[\xi_2]V=H$.

Member secret key 1009 is assumed to be a point x on the field $Z/pZ$ selected at random.

Member certificate 1008 is assumed to be composed of point y on the field $Z/pZ$ selected at random and A where $A=[1/(\gamma+y)]([1-x]G_1)$. Member secret key 1009 and member certificate 1008 are generated by member certificate—member secret key generation device 1005.

In the following, group signature device 1013 will be described.

Message 1012 that will be signed, group public key 1001, public key for tracing 1002, member secret key 1009, member certificate 1008, and a random number are input to group signature device 1013.

Group signature device 1013 selects points $\alpha$ and $\beta$ on $Z/pZ$ at random using the input random number. Thereafter, group signature device 1013 generates $$T_1=[\alpha]U$$

$$T_2=[\beta]V$$

$$T_3=[\alpha+\beta]H+A$$

that form member proof's encryption text 1020.

Group signature device 1013 also selects the points $\alpha'$ and $\beta'$, $\delta_1$ and $\delta'_2$, and $y'$ on $Z/pZ$ at random using the input random number. Thereafter, group signature device 1013 generates $$R_1=[\alpha']U$$

$$R_2=[\beta']V$$

$$R_3=e(T_3,G_2)^{\hat{}}(x') \cdot e(H,W)^{\hat{}}(-\alpha'-\beta') \cdot e(H,G_2)^{\hat{}}(-\delta'_1-\delta'_2) \cdot e(H,G_2)^{\hat{}}(y')$$

$$R_4=[x']T_1-[\Delta'_1]U$$

$$R_5=[x']T_2-[\Delta'_2]V$$

that forms a commitment,
where symbol "$\hat{}$" means a modular exponentiation.

Group signature device 1013 generates a hash value of group public key 1001, public key for tracing 1002, message 1012, U, V, $T_1$, $T_2$, $T_3$, $R_1$, $R_2$, $R_3$, $R_4$, and $R_5$ and treats the result as challenge value c.

Group signature device 1013 generates $$s\alpha=\alpha'+c\alpha$$

$$s\beta=\beta'+c\beta$$

$$s_x=x'+cx$$

$$s\delta_1=\delta'_1+cx\alpha$$

$$s\delta_2=\delta'_2+cx\beta$$

$$s_y=y'+xy$$

that form a response.

Group signature device 1013 outputs $T_1$, $T_2$, $T_3$, c, $s\alpha$, $s\beta$, $s_x$, $s\delta_1$, $s\delta_2$, and $s_y$ as group signature 1014 to m that is message 1012.

In the following, group signature verification device 1015 will be described.

Message 1012 that has been signed, group public key 1001, and public key for tracing 1002 are input to group signature verification device 1015.

Group signature verification device 1015 generates $$R_1=[s\alpha]U-[c]T_1$$

$$R_2=[s\beta]V-[c]T_2$$

$$R_3=e(T_3,G_2)^{\hat{}}(s_x) \cdot e(H,W)^{\hat{}}(-s\alpha-s\beta) \cdot e(H,G_2)^{\hat{}}(-s\delta_1-s\delta_2) \cdot e(H,G_2)^{\hat{}}(s_y) \cdot (e(G_1,G_2)/e(T_3,W))^{\hat{}}(-c)$$

$$R_4=[s_x]T_1-[s\delta_1]U$$

$$R_5=[s_x]T_2-[s\delta_2]U.$$

Thereafter, group signature verification device 1015 generates a hash value of group public key 1001, public key for tracing 1002, message 1012 that has been signed, U, V, T1, T2, T3, R1, R2, R3, R4, and R5 and checks whether the hash value matches challenge value c. When they match, group signature verification device 1015 determines that the group signature is valid; when they do not match, it determines that the group signature is invalid.

In the following, tracing device 1017 will be described.

Group signature 1014 that includes member proof's encryption text 1020 and secret key for tracing 1018 are input to tracing device 1017.

Tracing device 1017 computes $A=T_3-[\zeta_1]T_1-[\zeta_2]T_2$ that is member proof 1019.

Tracing device 1017 identifies a user who has A, which is member proof 1019, in a member certificate as a fraudulent person.

PRIOR ART DOCUMENT

Non-Patent Document

Non-patent Document 1: Dan Boneh, Xavier Boyen: Short Group Signature. Advances in Cryptology—CRYPTO 2004, Lecture Notes in Computer Science 3152, pp. 41-55, 2004, Springer

SUMMARY OF THE INVENTION

Problem to be Solved by the Invention

In the group signature described in Non-patent Document 1, a signer, who has a member certificate and a secret key, hid the entire information of the member certificate and generated a completely anonymous signature. Thus, a general verifier does not know information about the signer from the signature at all. This is at the opposite extreme to the case in which, in a general public key infrastructure based signature, a signer needs to present a signature by fully revealing his or her entire own public key certificate. However, if there is a need to generate a signature by revealing only a part of items of the public key certificate and to keep other items anonymous, this situation is not able to be handled by either the group signature described in Non-patent Document 1, or the general public key infrastructure based signature.

Therefore, an object of the present invention is to allow a user, who has a public key certificate, to generate his or her signature in such a manner that he or she only reveals desired item(s) of the public key certificate, but hides the other items thereof.

Means Solving Problem

To achieve the object, a signature system according to the present invention is structured such that the signature system includes a public key certificate obtainment device, a public key certificate issuance device, a signature device, a signature verification device, and a tracing device, wherein the public key certificate obtainment device inputs item data and an infrastructure public key that includes an item key that is an element corresponding to each item of the item data and outputs both a public key certificate including item data and a secret key using the data that have been input and data supplied from the public key certificate issuance device; the public key certificate issuance device inputs an infrastructure public key that includes the item key that is the element corresponding to each item of the item data and outputs a proof used to identify a signer using the data that have been input and the data supplied from the public key certificate obtainment device; the signature device inputs a message, a revelation item set that represents items to be revealed, the secret key and the public key certificate that the public key certificate obtainment device has output and outputs a selectively anonymous signature corresponding to the message and revelation item data that are item data that belong to the revelation item set using the data that have been input; the signature verification device inputs both the selectively anonymous signature and the revelation item data that the signature device has output and verifies the selectively anonymous signature using the data that have been input, and the tracing device inputs the selectively anonymous signature that the signature device has output and a secret key for tracing used to decrypt an encryption text of a part of a proof included in the selectively anonymous signature and outputs the part of the proof and decryption validity certification that is information that identifies the selectively anonymous signature using the data that have been input.

A public key certificate obtainment device according to the present invention comprises: input means that inputs a random number, item data, and an infrastructure public key that includes an item key that is an element corresponding to each item of the item data; communication means that transmits and receives the item data that have been input and data that include a public key certificate source that becomes a source or a public key certificate to and from a public key certificate issuance device; knowledge certification means that certifies the public key certificate issuance device of knowledge of a secret key using the random number that has been input by the input means and the data that have been received from the public key certificate issuance device by the communication means; and output means that outputs both the public key certificate that includes the item data and the secret key after knowledge of the secret key has been certified by the knowledge certification means.

A public key certificate issuance device according to the present invention comprises: input means that inputs a random number, an infrastructure secret key used to generate a public key certificate source that becomes a source of a public key certificate, and an infrastructure public key that includes an item key that is an element corresponding to each item of item data: communication means that transmits and receives the item data that have been input by a public key certificate obtainment device and data that include the public key certificate source to and from the public key certificate obtainment device; knowledge verification means that verifies that the public key certificate obtainment device has knowledge of a secret key using the random number that has been input that has been input by the input means and the data received from the public key certificate obtainment device by the communication means; and output means that outputs a proof and the item data used to identify a signer.

A signature device according to the present invention comprises: input means that inputs a message, a revelation item set that represents items to be revealed, a secret key, a public key certificate that includes item data, and an infrastructure public key that includes an item key that is an element corresponding to each item of the item data; knowledge certification text generation means that generates a certification text of knowledge about data excluding revelation item data that are the item data that belong to the revelation item set using the secret key and the public key certificate that have been input by the input means; and output means that outputs both a selectively anonymous signature corresponding to the message and the revelation item data.

A signature verification device according to the present invention comprises: input means that inputs a message, a revelation item set that represents items to be revealed, revelation item data that are item data that belong to the revelation item set, an infrastructure public key that includes an item key that is an element corresponding to each item of the item data, and a selectively anonymous signature corresponding to the message; knowledge certification text verification means that verifies that a certification text of knowledge about data excluding the revelation item data is included in the selectively anonymous signature using a secret key and a public key certificate that are input by the input means and determines whether or not the selectively anonymous signature is a valid signature corresponding to the message; and output means that outputs a determined result performed by the knowledge certification text verification means.

A tracing device according to the present invention comprises: input means that inputs an infrastructure public key that includes an item key that is an element corresponding to each item of item data, a selectively anonymous signature that is a selective signature corresponding to the message and that includes an encryption text of a part of a proof generated from a secret key, a secret key for tracing used to decrypt the encryption text, and a proof list used to identify a signer; decryption validity certification means that obtains the part of the proof generated from the secret key using the secret key and the selectively anonymous signature that have been input by the input means and that compares the obtained part of the proof and the proof list so as to generate a decryption validity certification that is information that identifies the selectively anonymous signature; and output means that outputs the part of the proof and the decryption validity certification obtained by the decryption validity certification means.

A signature generation method according to the present invention is carried out by a signature system that is structured such that the signature system includes a public key certificate obtainment device, a public key certificate issuance device, and a signature device, the signature generation method comprises: causing the public key certificate obtainment device to input item data and an infrastructure public key that includes an item key that is an element corresponding to each item of the item data and output both a public key certificate that includes the item data and a secret key using the data that have been input and data supplied from the public key certificate issuance device; causing the public key certificate issuance device to input the infrastructure public key that includes the item key that is the element corresponding to each item of the item data and output a proof used to identify a signer using the data that have been input and data supplied from the public key certificate obtainment device; and causing the signature device to input a message, a revelation item set that represents items to be revealed, the secret key and the public key certificate that the public key certificate obtainment device has output and output a selectively anonymous signature corresponding to the message and revelation item data that are the item data that belong to the revelation item set using the data that have been input.

A computer readable record medium according to the present invention records a program used for a signature system that is structured such that the signature system includes a public key certificate obtainment device, a public key certificate issuance device, and a signature device, the program comprises: causing a computer of the public key certificate obtainment device to input item data and an infrastructure public key that includes an item key that is an element corresponding to each item of the item data and output both a public key certificate that includes the item data and a secret key using the data that have been input and data supplied from the public key certificate issuance device; causing a computer of the public key certificate issuance device to input the infrastructure public key that includes the item key that is the element corresponding to each item of the item data and output a proof used to identify a signer using the data that have been input and data supplied from the public key certificate obtainment device; and causing a computer of the signature device to input a message, a revelation item set that represents items to be revealed, the secret key and the public key certificate that the public key certificate obtainment device has output and output a selectively anonymous signature corresponding to the message and revelation item data that are the item data that belong to the revelation item set using the data that have been input.

EFFECT OF THE INVENTION

According to the present invention, a user, who has a public key certificate, can generate his or her own signature in such a manner that he or she reveals any desired item(s) of the public key certificate, but hides the other items thereof.

MODES FOR CARRYING OUT THE INVENTION

In the following, with reference to drawings, exemplary embodiments according to the present invention will be described. Exemplary embodiments described in the following are preferable exemplary embodiments according to the present invention. Thus, various technically preferable limitations is added to the exemplary embodiments. The scope of the present invention, however, are not limited to these exemplary embodiments unless there is a notation in the following that the present invention is limited.

Prerequisite factors of exemplary embodiments that follow will be described.

p is assumed to be a prime number.

Each of group 1 and group 2 and group T, and group E is assumed to be a group whose order is p.

A bilinear map e from group 1 and group 2 to group T is assumed to exist.

Group E is assumed to be a group that is difficult to solve a Diffie-Hellman determination problem by using a multiplicative group on a prime field, or a general elliptic curve, or the like.

A homomorphism map from group 2 to group 1 is assumed to be a homomorphism map $\phi$.

A hash function that maps a character string to a field $(Z/pZ)$ is assumed to be a hash function Hash.

$G_2$ is assumed to be a generator of group 2.

$G_1$ is assumed to be a generator of group 1 where $\phi(G_2)=G_1$.

G is assumed to be a generator of group E.

A natural number n is assumed to be the number of items of a public key certificate.

H, H[1], ..., H[n], K are assumed to be elements of group 1 selected at random.

Each H[i] of (H[1], ..., H[n]) is assumed to be associated with an i-th item and referred to as an item key.

γ is assumed to be an element of the field Z/pZ selected at random.

Y=[γ]$G_2$ is assumed to be satisfied.

s and t are assumed to be two points selected at random from the field Z/pZ.

S and T are assumed to satisfy S=[s]G, T=[t]G.

An infrastructure secret key is assumed to be γ.

An infrastructure public key is assumed to be p.

A character string that describes group 1, group 2, group T, bilinear map e, homomorphism map φ, and hash function Hash is assumed to be $G_1$, $G_2$, G, H, n, H[1], ..., H[n], K, and Y.

A secret key for tracing is assumed to be (s, t).

A public key for tracing is assumed to be (S, T).

[Exemplary Embodiment 1]

As a first exemplary embodiment according to the present invention, a group signature system in which a member, who has a public key certificate, generates his or her own signature in such a manner that he or she reveals any desired item(s) of the public key certificate including the case in which he or she hides all the items thereof, generates a signature, verifies it, and a supervisor identifies a signer from the signature will be described.

Figure 1:
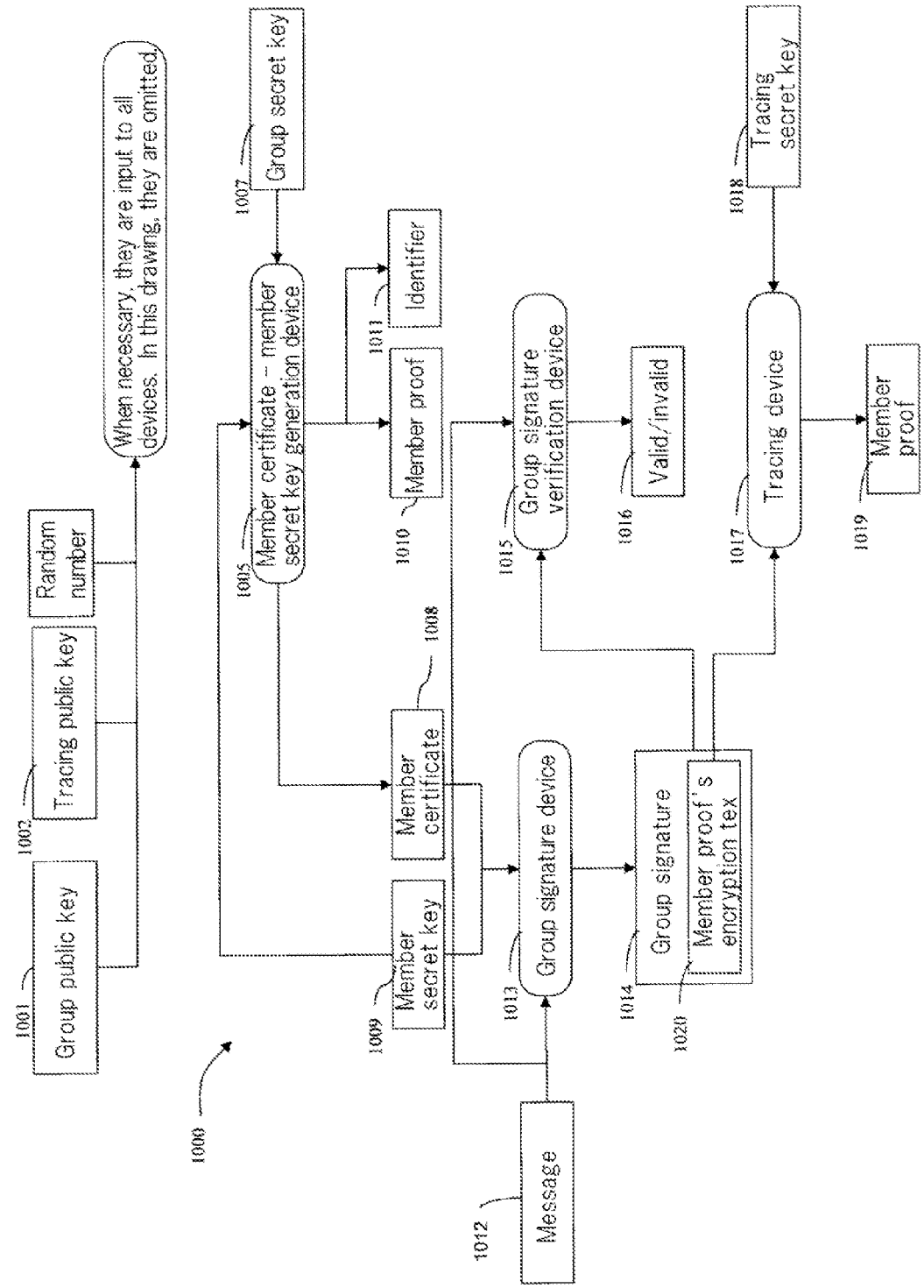
[FIG. 1] is a schematic diagram showing the system structure of a group signature system of the related art.
Figure 2:
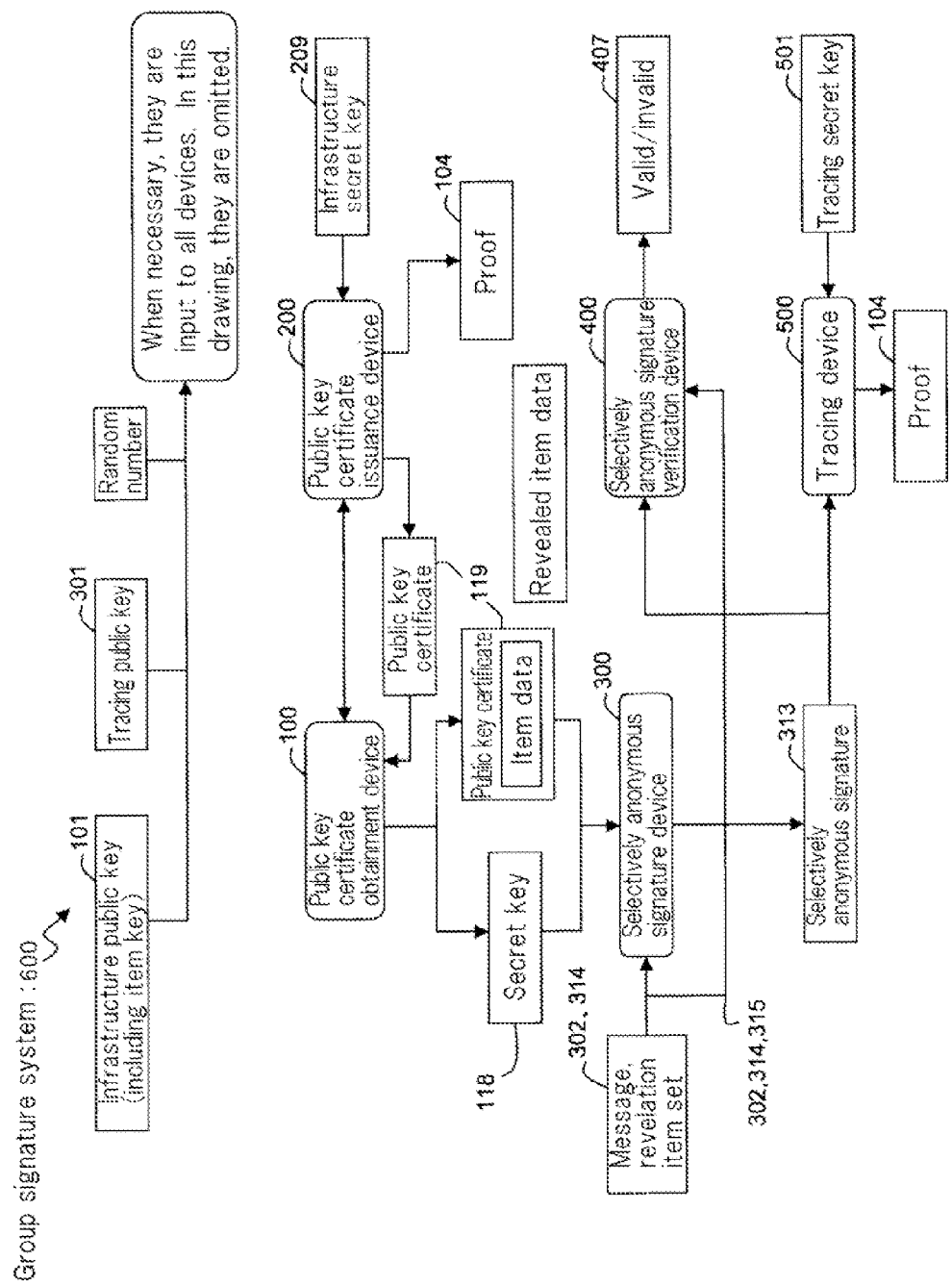
[FIG. 2] is a schematic diagram showing the system structure of a group signature system according to an exemplary embodiment according to the present invention.

FIG. 2 is a schematic diagram showing the structure of the group signature system of this exemplary embodiment. Group signature system 600 of this exemplary embodiment has public key certificate obtainment device 100, public key certificate issuance device 200, selectively anonymous signature device 300, selectively anonymous signature verification device 400, and tracing device 500.

Public key certificate obtainment device 100 obtains public key certificate 119 and secret key 118 by communicating with public key certificate issuance device 200. Item data are included in Public key certificate 119. Selectively anonymous signature device 300 accepts not only public key certificate 119 and secret key 118 that have been obtained, but also message 302, revelation item set 314, infrastructure public key 101, public key for tracing 301, and so forth and outputs selectively anonymous signature 313 corresponding to the message. Selectively anonymous signature verification device 400 accepts message 302, revelation item set 314, revealed item data 315, infrastructure public key 101, public key for tracing 301, and selectively anonymous signature 313 and outputs verification result 407 that denotes that selectively anonymous signature 313 is a valid signature corresponding to the message. Tracing device 500 accepts selectively anonymous signature 313, secret key for tracing 501, public key for tracing 301, and so forth and outputs proof 104 that represents a selectively anonymous signature that has been generated.

Figure 3:
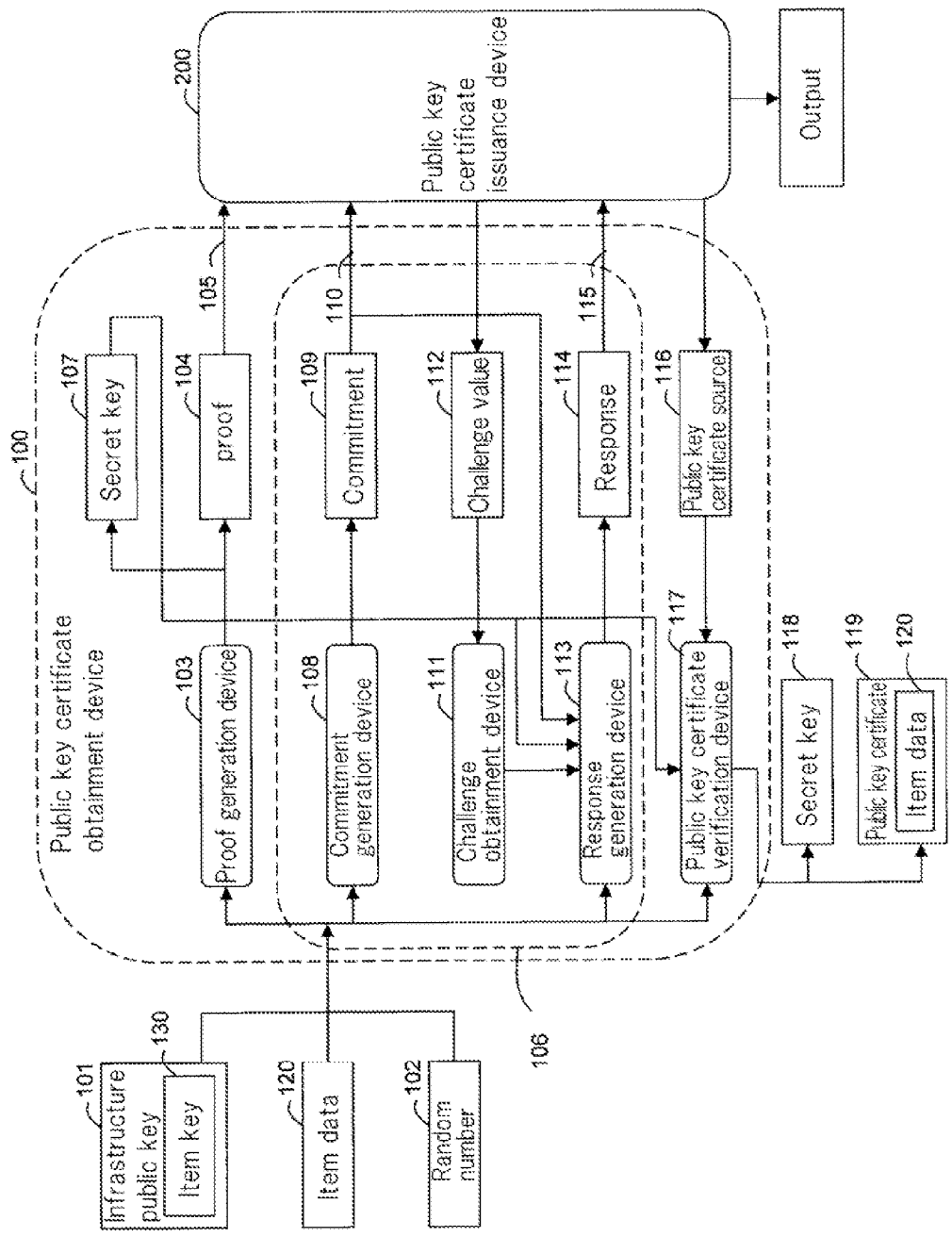
[FIG. 3] is a schematic diagram showing the structure of a public key certificate obtainment device according to an exemplary embodiment according to the present invention.

FIG. 3 is a schematic diagram showing the structure of a public key certificate obtainment device of this exemplary embodiment. Public key certificate obtainment device 100 is provided with not only a communication section, which communicates with public key certificate issuance device 200, but also an input section, an output section, and a computation section. The communication section can be generally referred to as first communication means. The input section can be referred to as first input means. The output section can be referred to as first output means. The computation section can be referred to as knowledge certification means. The communication section, the input section, the output section, and the computation section are accomplished by using hardware resources (a CPU, a main memory, and so forth).

First of all, public key certificate obtainment device 100 accepts infrastructure public key 101, random number 102, and (x[1], ..., x[n]) that is item data 120. Thereafter, proof generation device 103 selects x, which is secret key 107, from the field (Z/pZ) using random number 102 at random. Thereafter, proof generation device 103 generates $$Q=G^x,$$

$$H=H^x \Pi_{i=1}^n H[i]^{x[i]} K^{z'}$$

from x. This is referred to as proof 104. Thereafter, proof generation device 103 transmits (Q, H), which is proof 104, and (x[1], ..., x[n]), which is item data 120, to public key certificate issuance device 200. Thereafter, public key certificate issuance device 200 is certified to have knowledge of (x, z') that satisfies the following two formulas according to knowledge certification procedure 106 that follows.

$$Q=G^x,$$

$$H=H^x \Pi_{i=1}^n H[i]^{x[i]} K^{z'}$$

<Knowledge Certification Procedure 106>

In public key certificate obtainment device 100, commitment generation device 108 selects x', z' at random from the field (Z/pZ) using random number 102 that has been input, generates Q'=$G^{x'}$, H'=$H^{x'}K^{z'}$ as commitment 109, and transmits the commitment to public key certificate issuance device 200. Thereafter, challenge obtainment device 111 waits until challenge value 112 that is an element of the field Z/pZ, namely c, is transmitted from public key certificate issuance device 200. When response generation device 113 receives the challenge value c, response generation device 113 computes $$r=cx+x',$$

$$s=cz'+z'$$

as response 114 and transmit response 114 to public key certificate issuance device 200.

<After Certification Procedure>

Public key certificate verification device 117 waits until $$y \in Z/pZ,$$

$$z'' \in Z/pZ, \text{ and}$$

$$A \in \text{group 1},$$

which are public key certificate source 116, are transmitted from public key certificate issuance device 200. When public key certificate verification device 117 receives the foregoing values, public key certificate verification device 117 computes z=z'+z''. Thereafter, public key certificate verification device 117 checks that e(A, Y$G_2^y$). e($H^x \Pi_{i=1}^n H[i]^{x[i]}$, $G_2$)·e ($K^z$, $G_2$)=e($G_1$, $G_2$) is satisfied. Thereafter, public key certificate verification device 117 outputs both (A, y, x[1], ..., x[n], z), which is public key certificate 119 including (x[1], ..., x[n]) that is item data 120, and x that is secret key 118.

Figure 4:
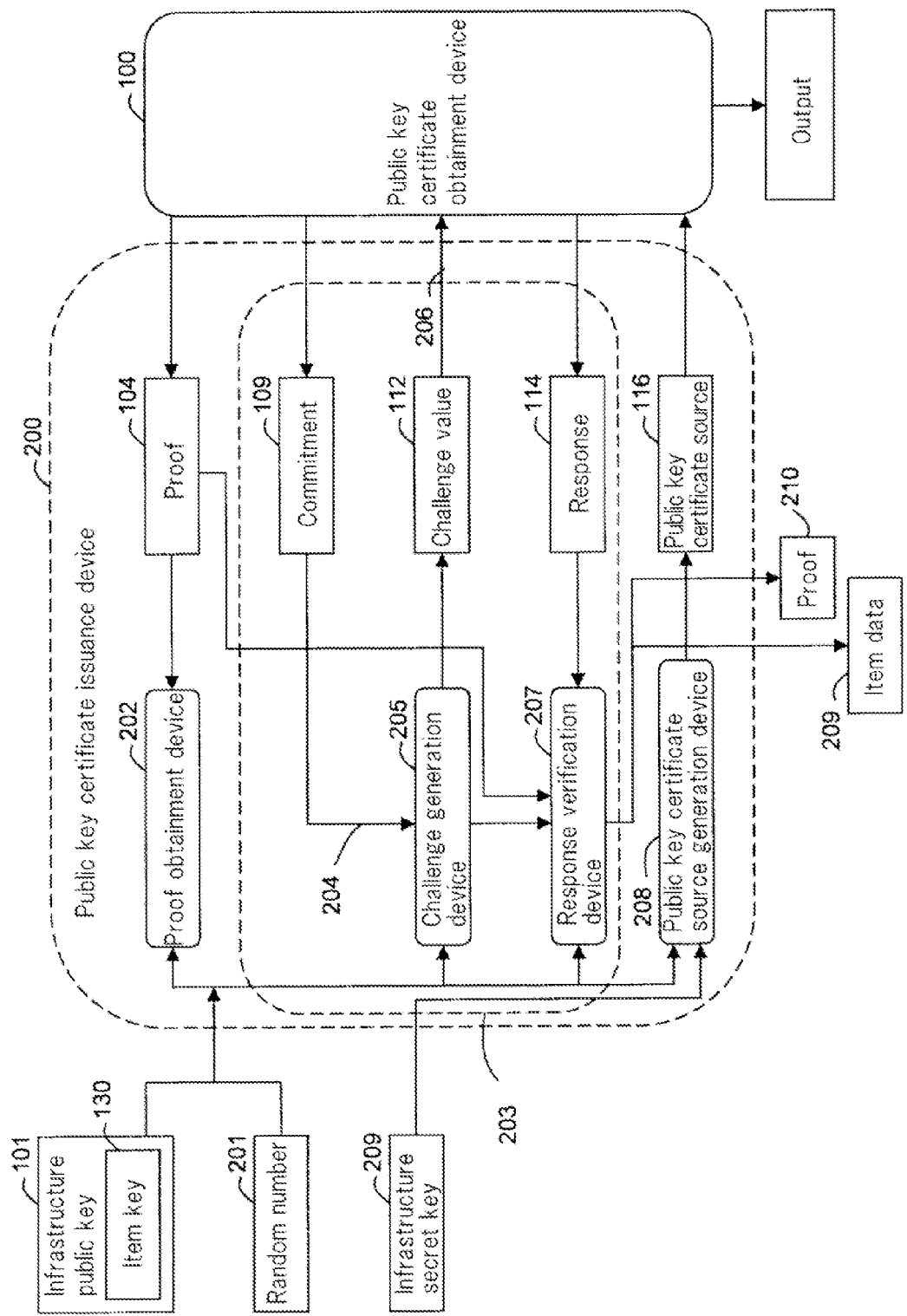
[FIG. 4] is a schematic diagram showing the structure of a public key certificate issuance device according to an exemplary embodiment according to the present invention.

FIG. 4 is a schematic diagram showing the structure of the public key certificate generation device of this exemplary embodiment. Public key certificate issuance device 200 is provided with not only a communication section, which communicates with public key certificate obtainment device 100, but also an input section, an output section, and a computation section. The communication section can be generally referred to as second communication means. The input section can be generally referred to as second input means. The output section can be generally referred to as second output means. The computation section can be generally referred to as knowledge verification means. The communication section, the input section, the output section, and the computation section are accomplished by using hardware resources (a CPU, a main memory, and so forth).

First of all, public key certificate issuance device 200 accepts infrastructure public key 101, infrastructure secret key 209, and random number 201. Thereafter, public key certificate issuance device 200 waits until (Q, H)∈(group E, group 1), which is proof 104, and (x[1], ..., x[n]), which is item data 120, are transmitted from public key certificate obtainment device 100. When public key certificate issuance device 200 receives data from public key certificate obtainment device 100, public key certificate issuance device 200 verifies not only that item data 120 are valid, but also that public key certificate obtainment device 100 has knowledge of $x_u$, $z'_u$ that satisfies the following two formulas according to knowledge verification procedure 203 that follows.

$$Q=G^x,$$

$$H=H^x \Pi_{i=l}^n H[i]^{x[i]} K^{z'}$$

<Knowledge Verification Procedure 203>

In public key certificate issuance device 200, challenge generation device 205 waits until (Q', H')∈(group E, group 1) that is commitment 109 is transmitted from public key certificate obtainment device 100. When commitment 109 is transmitted to challenge generation device 205, it selects at random c, which is challenge value 112, from the field (Z/pZ) using random number 201 that has been input. Challenge generation device 205 transmits c that is challenge value 112 to public key certificate obtainment device 100. Response verification device 207 waits until (r, s)∈(Z/pZ)² that is response 114 is transmitted from public key certificate obtainment device 100. When response 114 is transmitted to response verification device 207, it checks that $$G^r=Q^c Q',$$

$$H^r K^s = (H/\Pi_{i=l}^n H[i]^{x[i]})^c H'$$

are satisfied.

<After Verification Procedure>

Using public key certificate source generation device 208, public key certificate issuance device 200 selects (y, z″)∈(Z/pZ, Z/pZ) using random number 201 that has been input and generates $$A=(G_I H^{-1} K^{-z''})^{1/(\gamma+y)}.$$

Public key certificate source generation device 208 transmits (A, y, z″) as public key certificate source 119 to public key certificate obtainment device 100. Thereafter, Q, which is proof 210, and (x[1], ... x[n]), which is item data 120, are output.

Figure 5:
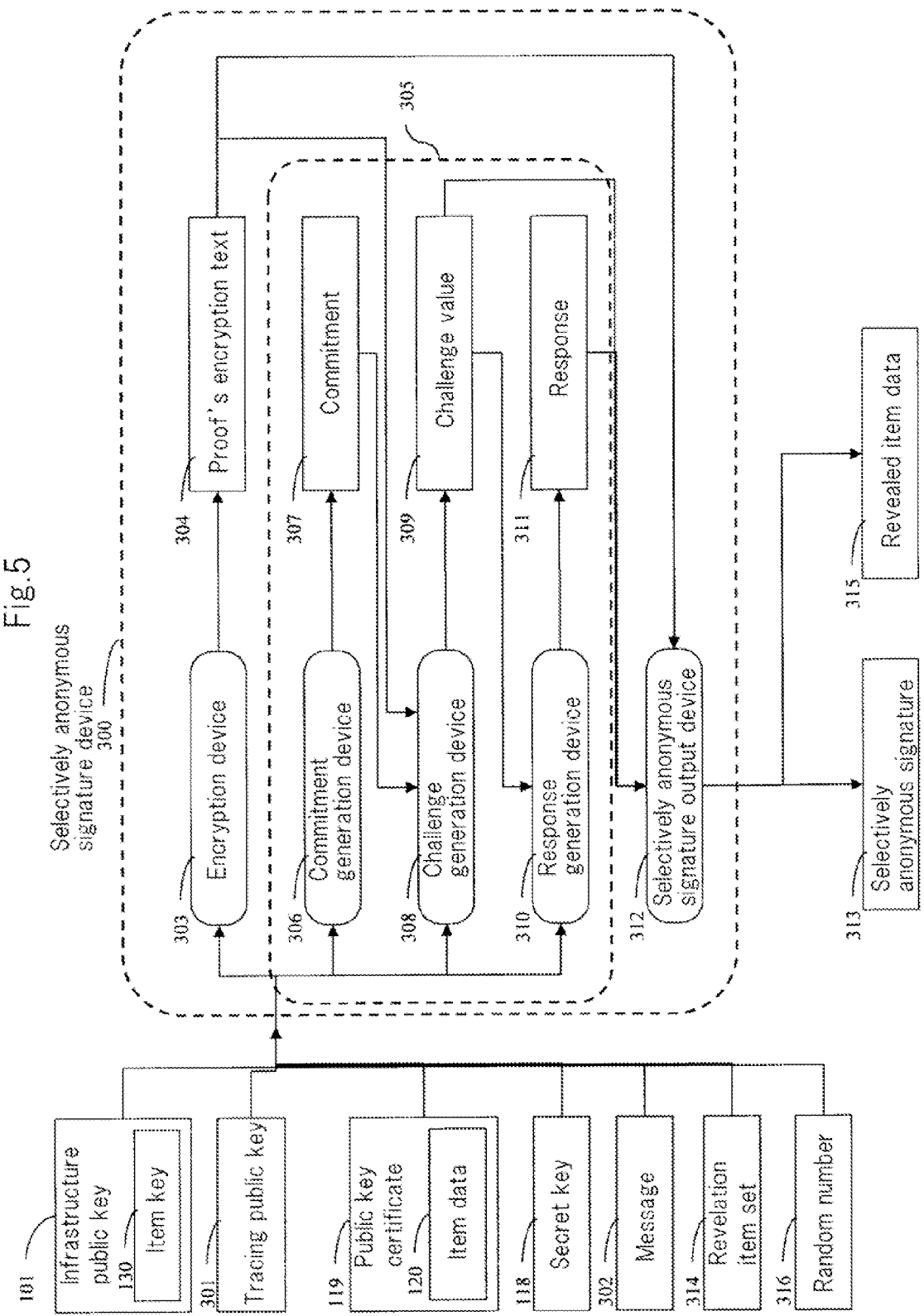
[FIG. 5] is a schematic diagram showing the structure of a selectively anonymous signature device according to an exemplary embodiment according to the present invention.

FIG. 5 is a schematic diagram showing the structure of the selectively anonymous signature device of this exemplary embodiment. Selectively anonymous signature device 300 is provided with an input section, an output section, and a computation section. The input section can be generally referred to as third input means. The output section can be generally referred to as third output means. The computation section can be generally referred to as knowledge certification text generation means. The input section, the output section, and the computation section are accomplished by using hardware resources (a CPU, a main memory, and so forth).

First of all, selectively anonymous signature device 300 accepts infrastructure public key 101, public key for tracing 301, public key certificate 119 including item data 120, secret key 118, S ⊂ [1, ..., n] that is revelation item set 314, m that is message 302, and random number 303. Thereafter, encryption device 303 selects q, r from field Z/pZ at random and generates $$B=AK^q,$$

$$U=G^{x+r},$$

$$V=S^r,$$

$$W=T^r$$

that form proofs encryption text 304. Thereafter, when (p, $G_1$, $G_2$, G, H, n, H[1], ..., H[n], K, Y, B, U, V, W, $(x[i])_{i \in S}$) is given to knowledge's certification text generation device 305, it generates a certification text of knowledge of x and not-revealed item data $(x[i])_{i \in [1, ..., n] \backslash S}$, y, Z, q, r) that satisfy $$e(G_1,G_2)e(B,Y)^{-1}e(H,\Pi_{i \in S}H[i]^{-x[i]})=e(H,G_2)^x e(H, \Pi_{i \in [1, ..., n] \backslash S}H[i]^{x[i]})e(B,G_2)^y e(K,G_2)^z e(K,y)^{-q},$$

$$U=G^{x+r},$$

$$V=S^r, \text{ and}$$

$$W=T^r$$

in the following manner.

<Knowledge's Certification Text Generation Process>

Commitment generation device 306 selects t, u, v, w, o, $(x'[i])_{i \in [1, ..., n] \backslash S}$ from the field Z/pZ at random. Thereafter, commitment generation device 306 generates $$X'=e(h,G_2)^\wedge te(H,\Pi_{i \in [1, ..., n] \backslash S}H[i]^{x'[i]})e(B,G_2)^u e(K,G_2)^v e(K,Y)^{-W},$$

$$U'=G^{t+o},$$

$$V'=S^o,$$

$$W'=T^o$$

that form commitment 307. Thereafter, commitment generation device 306 treats (X', U', V', W') as a commitment. Thereafter, challenge value generation device 308 generates c=Hash(p, $G_1$, $G_2$, G, H, n, H[1], ..., H[n], K, Y, B, U, V, W, $(x[i])_{i \in S}$, X', U', V', W', m) that is challenge value 309. Thereafter, response generation device 310 generates $$x'=cx+t,$$

$$x''[i]=cx[i]+x'[i] \text{ with respect to } i \in [1, ..., n] \backslash S,$$

$$y'=cy+u,$$

$$z'=c(z-qy)+v,$$

$$q'=cq+w, \text{ and}$$

$$r'=cr+o.$$

Thereafter, response generation device 310 treats (x, $(x'[i])_{i \in [1, ..., n] \backslash S}$, y', z', q', r') as a response.

<After Generation Process>

In selectively anonymous signature device 300, selectively anonymous signature output device 312 outputs (X', U', V', W', x', $(x'[i])_{i \in [1, ..., n] \backslash S}$, y', z', q', r') as selectively anonymous signature 313 that reveals (S, $x[i])_{i \in S}$ that is item data 315 of the public key certificate.

Figure 6:
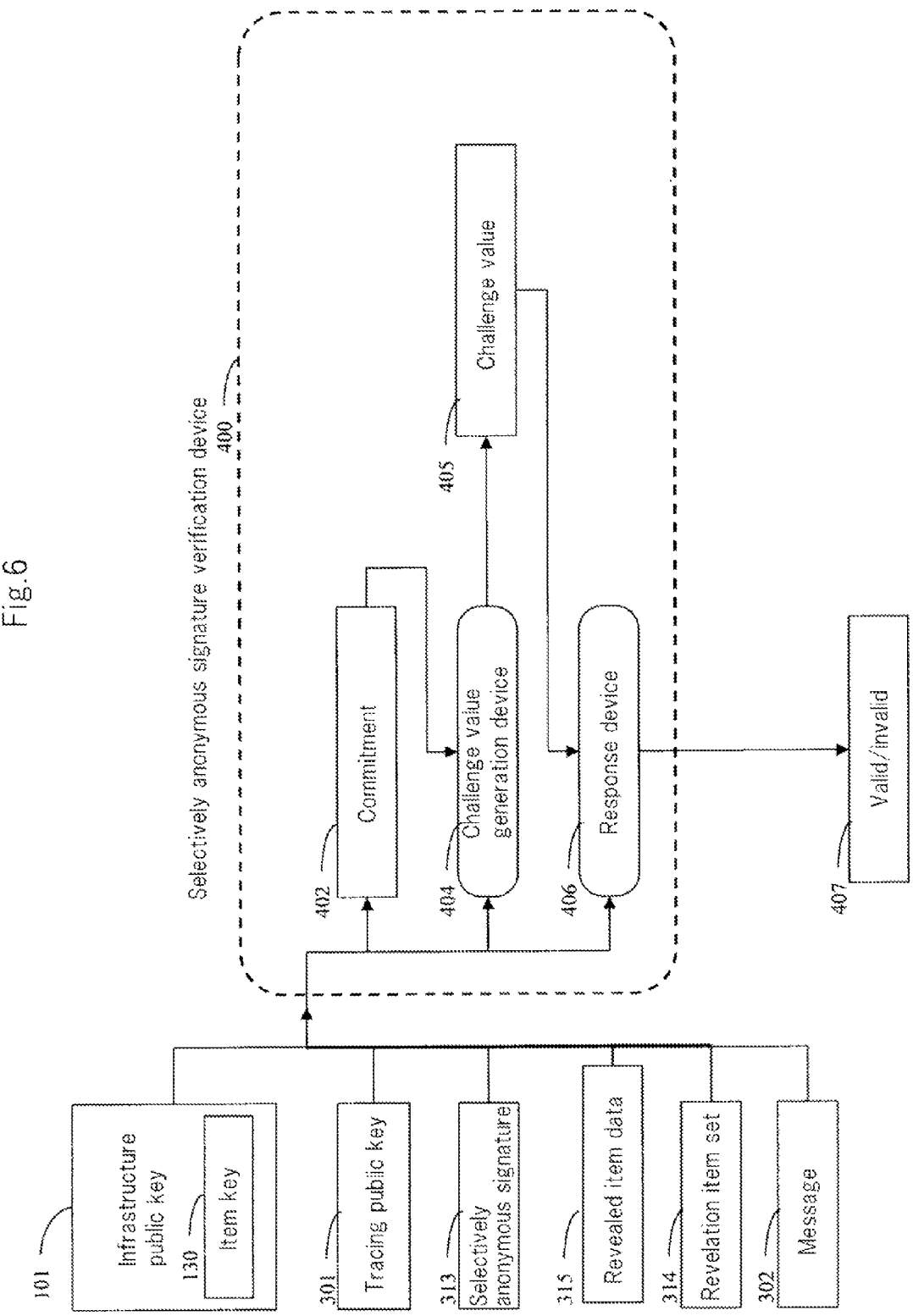
[FIG. 6] is a schematic diagram showing the structure of a selectively anonymous signature verification device according to an exemplary embodiment according to the present invention.

FIG. 6 is a schematic diagram showing the structure of the selectively anonymous signature verification device of this exemplary embodiment. Selectively anonymous signature verification device 400 is provided with an input section, an output section, and a computation section. The input section can be generally referred to as fourth input means. The output section can be generally referred to as fourth output means. The computation section can be generally referred to as knowledge certification text verification means. The input section, the output section, and the computation section are accomplished by using hardware resources (a CPU, a main memory, and so forth).

First, selectively anonymous signature verification device 400 inputs infrastructure public key 101, public key for tracing 301, message 302, S that is revelation item set 314, $(x[i])_{i \backslash S}$ that is revealed item data 315, and (X', U', V', W', x', $(x'[i])_{i \in [l, \ldots, n] \backslash S}$, y', z', q', r') that is selectively anonymous signature 313. Thereafter, when (p, $G_1$, $G_2$, G, H, n, H[1], ..., H[n], K, Y, B, U, V, W, $(x[i])_{i \in S}$ is given to selectively anonymous signature verification device 400 that functions also as a knowledge's certification text verification device, a certification text of knowledge of (x, $[i])_{i \in [l, \ldots, n] \backslash S}$, y, z, q, r) that satisfies $$e(G_1,G_2)e(B,Y)^{-1}e(H,\Pi_{i \backslash S}H[i]^{-x[i]})=e(H,G_2)^x e(H, \Pi_{i \in [l,\ldots,n] \backslash S}H[i]^{x[i]})e(B,G_2)^y e(K,G_2)^z e(K,y)^{-q},$$

$$U=G^{x+r},$$

$$V=S^r, \text{ and}$$

$$W=T^r$$

in the following manner has been certified.

Challenge value generation device 404 computes c=Hash (p, $G_1$, $G_2$, G, H, n, H[1], ... H(n), K, Y, B, U, V, W, $(x[i])_{i \in S}$, X', U', V', W', m) that is challenge value 405. Thereafter, response device 406 checks that the following formulas are satisfied.

$$(e(G_1,G_2)e(B,Y)^{-1}e(H,\Pi_{i \in S}H[i]^{-x[i]}))^c X'=e(H,G_2)^{x'}e(H,\Pi^{i \in [l,\ldots,n] \backslash S}H[i]^{x-[i]})e(B,G_2)^{y'}e(K,G_2)^{z'}e(K,Y)^{-q'},$$

$$U^c U'=G^{x'+r'},$$

$$V^c V'=S^{r'}, \text{ and}$$

$$W^c W'=T^{r'}.$$

When these formulas are satisfied, response device 406 outputs "valid"; when they are not satisfied, it outputs "invalid."

Figure 7:
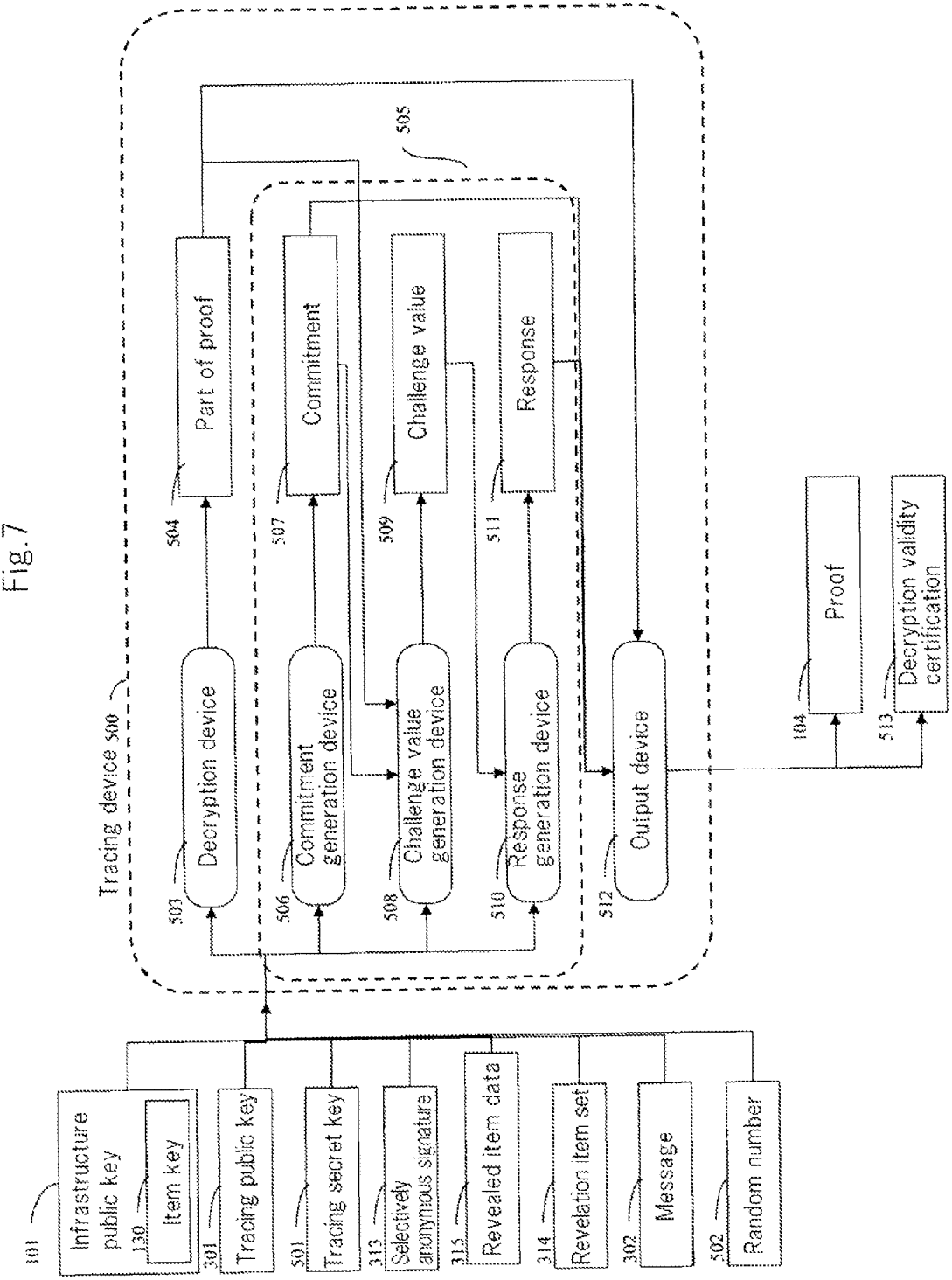
[FIG. 7] is a schematic diagram showing the structure of a tracing device according to an exemplary embodiment according to the present invention.

FIG. 7 is a schematic diagram showing the structure of the tracing device of this exemplary embodiment. Tracing device 500 is provided with an input section, an output section, and a computation section. The input section can be generally referred to as fifth input means. The output section can be generally referred to as fifth output means. The computation section can be generally referred to as decryption validity certification means. The input section, the output section, and the computation section are accomplished by using hardware resources (a CPU, a main memory, and so forth).

First, tracing, device 500 accepts infrastructure public key 101, public key for tracing 301, secret key for tracing 501, m that is message 302, S that is revelation item set 314, $(x[i])_{i \backslash S}$ that is revelation item data 315, (X', U', V', W', x', $(x'[i])_{i \in [l, \ldots, n] \backslash S}$, y', z', q', r') that is selectively anonymous signature 313, and random number 502. Thereafter, decryption device 503 generates Q=U−[1/s]V that is proof's part 504 from an encryption text of a part of a proof and the secret key for tracing. Thereafter, decryption certification device 505 generates a decryption validity certification text in the following manner.

First of all, in decryption certification device 505, commitment generation device 506 selects element r from field ZpZ using the random number and generates $$V''=[r]V,$$

$$G''=[r]G$$

that form commitment 507.

Thereafter, challenge value generation device 508 generates $$C''=\text{Hash}(p,G_1,G_2,G,H,n,H[l],\ldots,H[n],K,Y,U,V,Q,V'',G'')$$

as challenge value 509.

Thereafter, response generation device 510 generates $$r''=c''\backslash S+r$$

as response 511.

Thereafter, response generation device 510 treats (V'', G'', r'') as decryption validity certification.

Thereafter, output device 512 outputs Q that is proof's part 104 and (V'', G'', r'') that is decryption validity certification 513.

[Exemplary Embodiment 2]

As a second exemplary embodiment according to the present invention, a group signature system in which a selectively anonymous signature device is substituted for a selectively anonymous tartlet authentication device and a selectively anonymous signature verification device is substituted for a selectively anonymous authentication device will be described. Since the internal devices of the above two devices (a public key certificate obtainment device, a public key certificate issuance device, and a tracing device) are the same as those of exemplary embodiment 1, only the selectively anonymous target authentication device and the selectively anonymous authentication device that differ from those of exemplary embodiment 1 will be described.

Figure 8:
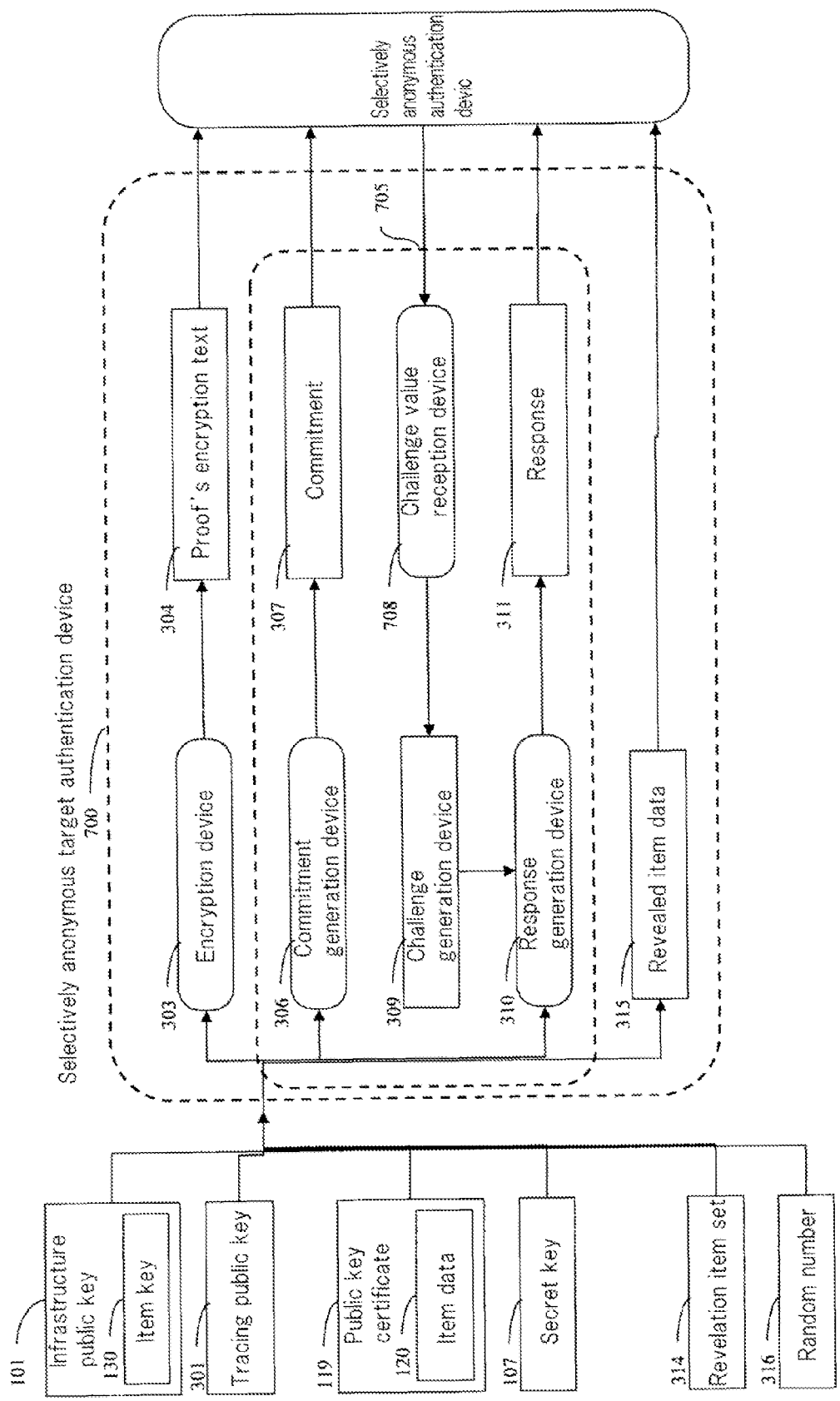
[FIG. 8] is a schematic diagram showing the structure of a selectively anonymous target authentication device according to an exemplary embodiment according to the present invention.

FIG. 8 is a schematic diagram showing the structure of the selectively anonymous target authentication device of this exemplary embodiment. Selectively anonymous target authentication device 700 is provided with an input section, an output section, and a computation section. The input section can be generally referred to as third input means. The output section can be generally referred to as third output means. The computation section can be generally referred to as knowledge certification means. The input section, the output section, and the computation section are accomplished by using hardware resources (a CPU, a main memory, and so forth).

First of all, selectively anonymous target authentication device 700 accepts infrastructure public key 101, public key for tracing 301, public key certificate 119 including item data 120, secret key 107, S ⊂ [1, ..., n], that is revelation item set 314, and random number 316.

Thereafter, encryption device 303 selects q, r from the field Z/pZ at random and venerates $$B=AK^q,$$

$$U=G^{x+r},$$

$$V=S^r, \text{ and}$$

$$W=T^r$$

that form proof's encryption text 304.

Thereafter, when $(p, G_1, G_2, G, H, n, H[1], \ldots, H[n], K, Y, B, U, V, W, (x[i])_{i\setminus S})$ is given to knowledge's certification device 705, it certifies to the selectively anonymous authentication device of knowledge of x and item data $(x[i])_{i\in[1,\ldots,n]\setminus S}, y, z, q, r)$ that have not been revealed and that satisfy $$e(G_1,G_2)e(B,Y)^{-1}e(H,\Pi_{i\in S}H[i]^{-x[i]})=e(H,G_2)^x e(H,\Pi_{i\in[1,\ldots,n]\setminus S}H[i]^{x[i]})e(B,G_2)^y e(K,G_2)^z e(K,Y)^{-q},$$

$$U=G^{x+r}$$

$$V=S^r,$$

$$W=T^r$$

in the following manner. In this case, selectively anonymous target authentication device 700 sends $(S, x[i])_{i\setminus S}$ that is item data 315 of the public key certificate to the selectively anonymous authentication device.

<Knowledge's Certification Process>

First, commitment generation device 306 selects t, u, v, w, o, $(x'[i])_{i\in[1,\ldots,n]\setminus S}$ from field Z/pZ at random. Thereafter, commitment generation device 306 generates $$X'=e(H,G_2)^t e(H,\Pi_{i\in[1,\ldots,n]\setminus S}H[i]x'[i])e(B,G_2)^u e(K,G_2)^v e(K,Y)^{-w},$$

$$U'=G^{t+o},$$

$$V'=S^o, \text{ and}$$

$$W'=T^o$$

that form commitment 307. Thereafter, commitment generation device 306 sends (X', U', V', W') as a commitment to the selectively anonymous authentication device.

Thereafter, in selectively anonymous target authentication device 700, challenge value reception device 708 receives c that is challenge value 309 from the selectively anonymous authentication device.

Thereafter, response generation device 310 generates $$x'=cx+t,$$

$$x''[i]=cx[i]+x'[i] \text{ with respect to } i\in[1,\ldots,n]\setminus S,$$

$$y'=cy+u,$$

$$z'=c(z-qy)+v,$$

$$q'=cq+w,$$

$$r'=cr+o.$$

Thereafter, response generation device 310 treats $(x, (x'[i])_{i\in[1,\ldots,n]\setminus S}, y', z', q', r')$ as a response and sends the response to the selectively anonymous authentication device.

In the selectively anonymous target authentication device of this exemplary embodiment, the generation of a knowledge certification text of in the selectively anonymous signature device is substituted with a knowledge certification process. Thus, the other operations and inner stricture of the selectively anonymous target authentication device are the same as those of the selectively anonymous signature device. A knowledge certification text can certify retention of particular knowledge only by sending a document referred to as a certification text from a certifier to a verifier. On the other hand, to accomplish the same objective, the certification of knowledge requires the certifier and the verifier to converse with each other (a plurality of times of communication).

Figure 9:
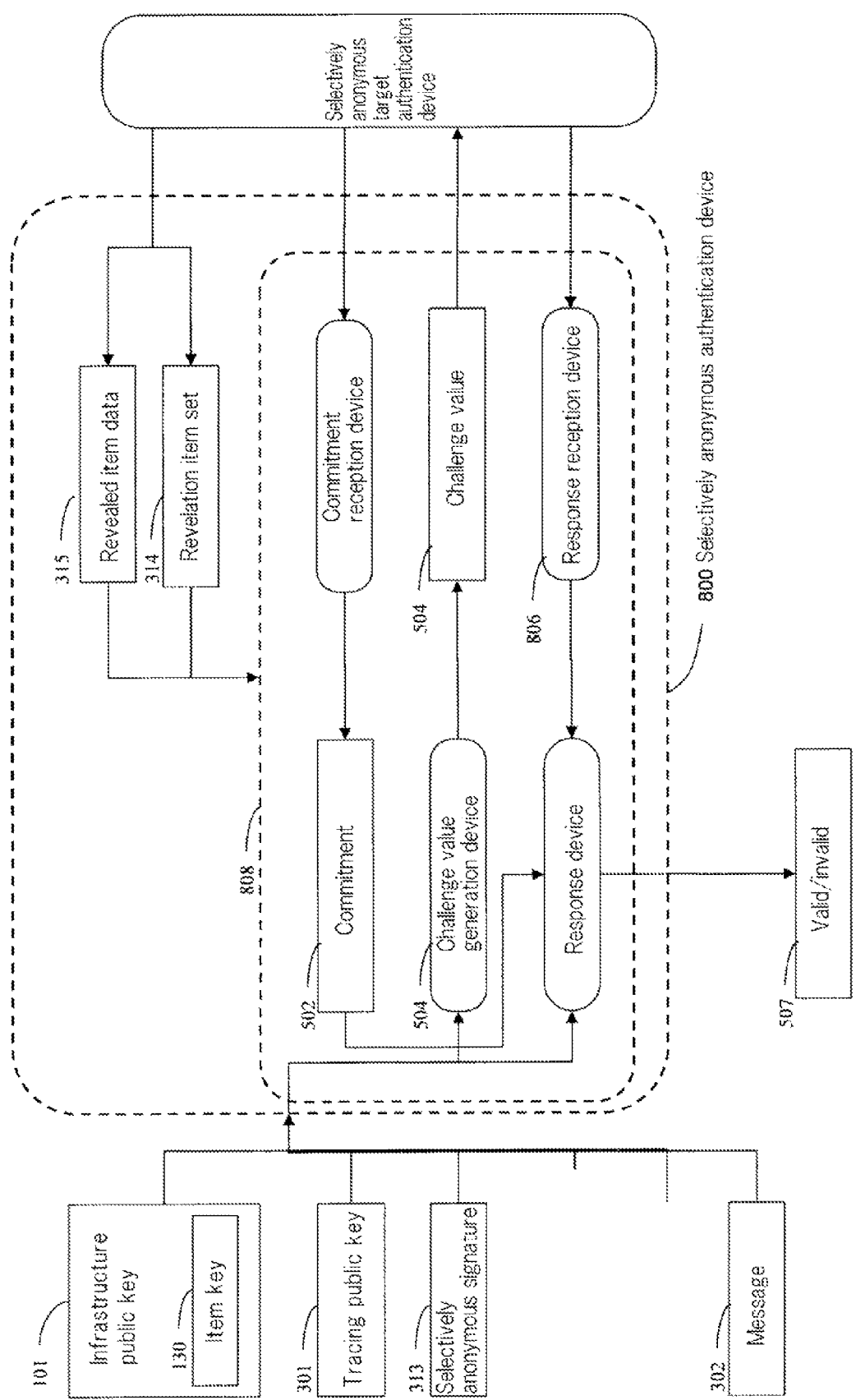
[FIG. 9] is a schematic diagram showing the structure of a selectively anonymous authentication device according to an exemplary embodiment according to the present invention.

FIG. 9 is a schematic diagram showing the structure of the selectively anonymous authentication device of this exemplary embodiment. Selectively anonymous authentication device 800 is provided with an input section, an output section, and a computation section. The input section can be generally referred to as fourth input means. The output section can be generally referred to as fourth output means. The computation section can be generally referred to as knowledge verification means. The input section, the output section, and the computation section are accomplished by using hardware resources (a CPU, a main memory, and so forth).

First of all, selectively anonymous authentication device 800 accepts infrastructure public key 101 and public key for tracing 301.

Thereafter, knowledge's verification device 808 receives a commitment, S that is revelation item set 314, and $(S, x[i])_{i\setminus S}$ that is item data 315 of the corresponding public key certificate from selectively anonymous target authentication device 700. When $(p, G_1, G_2, G, H, n, H[1], \ldots, H[n], K, Y, B, U, V, W, (x[i])_{i\setminus S})$ is given to knowledge's verification device 808, it verifies the certification of knowledge of $(x, (x[i])_{i\in[1,\ldots,n]\setminus S}, y, z, q, r)$ that satisfies $(e(G_1,G_2)e(B,Y)^{-1}e(H, \Pi_{i\in S}H[i]^{-x[i]})= e(H, G_2)^x e(H,\Pi i\in[1,\ldots,n]\setminus S H[i]^{x[i]})e(B, G_2)^y e(K, G_2)^z e(K,Y)^{-q},$ $$U=G^{x+r}$$

$$V=S^r, \text{ and}$$

$$W=T^r$$

in the following manner.

First of all, challenge value generation device 504 generates c that is challenge value 505 at random. Challenge value generation device 504 transmits c to selectively anonymous target authentication device 700.

Thereafter, response reception device 806 receives $(x, (x'[i])_{i\in[1,\ldots,n]\setminus S}, y', z', q', r')$ that is a response from selectively anonymous target authentication device 700.

Thereafter, the response device checks that the following formulas are satisfied.

$$(e(G_1,G_2)e(B,Y)^{-1}e(H,\Pi_{i\in S}H[i]^{-x[i]}))^c X'=e(H,G_2)^{x'}e(H,\Pi_{i\in[1,\ldots,n]\setminus S}H[i]^{x'[i]})e(B,G_2)^{y'}e(K,G_2)^{z'}e(K,Y)^{-q'}.$$

$$U^c U'=G^{x'+r'}$$

$$V^c V'=S^{r'},$$

$$W^c W'=T^{r'}.$$

When these formulas are satisfied, the response device outputs "valid"; when they are not satisfied, it outputs "invalid."

In the selectively anonymous authentication device of this exemplary embodiment, the verification of a knowledge certification text of in the selectively anonymous signature verification device is substituted with a knowledge verification process. Thus, the other operations and inner structure of the selectively anonymous authentication device are the same as those of the selectively anonymous signature verification device. A knowledge certification text can verify certifier's retention of particular knowledge only by causing a verifier to receive a document referred to as a certification text from a certifier. On the other hand, to accomplish the same objective, the verification of knowledge requires the certifier and the verifier to converse with each other (a plurality of times of communication).

According to the above-described exemplary embodiment according to the present invention, any desired part of item data included in a public key certificate can be hidden. On the other hand, to generate a certification text of knowledge, item data exist and possession of knowledge with respect thereto is assured. This means that although a conventional signature based on a public key infrastructure reveals the entire public key certificate, the exemplary embodiment has an effect that can hide unnecessary part(s) and undesired part(s). Although the group signature of the prior art can hide all the parts, it is incapable of presenting even attributes of the signer that represent the signature of the valid signer. This exemplary embodiment can solve the problems on both the sides.

The above-described exemplary embodiments are preferred exemplary embodiments according to the present invention and therefore the scope of the present invention is not limited only to the above-described exemplary embodiments, instead, the structure and details of the present invention may be changed in various manners without departing from the scope of the present invention.

In other words, a program executed in the group signature system of this exemplary embodiment is structured as modules including the above-described individual means (knowledge certification means, knowledge verification means, knowledge certification text generation means, knowledge certification text verification means, and so forth) and accomplishes specific means using real hardware. In other words, when a computer (CPU) reads a program from a particular record medium and executes the program, each of the above-described means is loaded to a main memory device and thereby the knowledge certification means, the knowledge verification means, the knowledge certification text generation means, the knowledge certification text verification means, and so forth are generated on the main memory device.

A program executed by the group signature system of this exemplary embodiment may be structured so that it is provided such that the program is stored in a computer connected to a network such as the Internet or downloaded through the network. Alternatively, the above-described program may be provided or distributed through a network such as the Internet.

Alternatively, the above-described program may be structured such that it is provided as a file that is installable or executable and is recorded on a computer-readable record medium such as a floppy (registered trademark) disk, a hard disk, an optical disc, a magneto-optical disc, a CD-ROM, a CD-R, a DVD, or a non-volatile memory card. Alternatively, the above-described program may be structured such that it is pre-installed on ROM or the like and provided therewith.

In this case, a program code that is read from the above-described record medium or loaded through a communication line and then executed accomplishes the functions of the above-described exemplary embodiments. The record medium that records the program code constitutes the present invention.

Now, with reference to the exemplary embodiments, the present invention has been described. However, it should be understood by those skilled in the art that the structure and details of the present invention may be changed in various manners without departing from the scope of the present invention.

DESCRIPTION OF REFERENCE NUMERALS

100 Public key certificate obtainment device
101 Infrastructure public key
102, 201, 316, 502 Random number
104, 210 Proof
118 Secret key
119 Public key certificate
120 Item data
200 Public key certificate issuance device
209 Infrastructure secret key
300 Selectively anonymous signature device
301 Public key for tracing
302 Message
313 Selectively anonymous signature
314 Revelation item set
315 Revealed item data
400 Selectively anonymous signature verification device
407 Valid/invalid
500 Tracing device
501 Secret key for tracing
600 Group signature device
700 Selectively anonymous target authentication device
800 Selectively anonymous authentication device

The invention claimed is:

1. A signature system that is structured such that said signature system includes a public key certificate obtainment device, a public key certificate issuance device, a signature device, a signature verification device, and a tracing device,
   wherein said public key certificate obtainment device inputs item data and an infrastructure public key that includes an item key that is an element corresponding to each item of said item data and outputs both a public key certificate including item data and a secret key using said data that have been input and data supplied from said public key certificate issuance device,
   wherein said public key certificate issuance device inputs an infrastructure public key that includes the item key that is the element corresponding to each item of the item data and outputs a proof that will be used to identify a signer using said data that have been input and the data supplied from said public key certificate obtainment device,
   wherein said signature device inputs a message, a revelation item set that represents items to be revealed, the secret key and the public key certificate that said public key certificate obtainment device has output and outputs a selectively anonymous signature corresponding to said message and revelation item data that are item data that belong to said revelation item set using said data that have been input,
   wherein said signature verification device inputs both the selectively anonymous signature and the revelation item data that said signature device has output and verifies said selectively anonymous signature using said data that have been input, and
   wherein said tracing device inputs the selectively anonymous signature that said signature device has output and a secret key for tracing used to decrypt an encryption text of a part of a proof included in said selectively anonymous signature and outputs the part of said proof and decryption validity certification that is information that identifies said selectively anonymous signature using said data that have been input.

2. The signature system according to claim 1,
   wherein said public key certificate obtainment device comprises:
   hardware, including a processor;
   a first input unit implemented at least by the hardware and that inputs a random number, the item data, and the infrastructure public key that includes the item key that is the element corresponding to each item of said item data;
   a first communication unit implemented at least by the hardware and that transmits and receives said item data that have been input and data that include a public key certificate source that becomes a source of the public key certificate to and from said public key certificate issuance device;

a knowledge certification unit implemented at least by the hardware and that certifies said public key certificate issuance device of knowledge of a secret key using said random number that has been input and the data that have been received from said public key certificate issuance device; and a first output unit implemented at least by the hardware and that outputs the public key certificate including the item data and the secret key after the knowledge of the secret key has been certified by said knowledge certification unit.

3. The signature system according to claim 1, wherein said public key certificate issuance device comprises:

hardware, including a processor;

a second input unit implemented at least by the hardware and that inputs a random number, the infrastructure secret key used to generate the public key certificate source that becomes the source of the public key certificate, and the infrastructure public key that includes an item key that is the element corresponding to each item of the item data;

a second communication unit implemented at least by the hardware and that transmits and receives the item data that have been input by said public key certificate obtainment device and data that include said public key certificate source to and from said public key certificate obtainment device;

a knowledge verification unit implemented at least by the hardware and that verifies that said public key certificate obtainment device has the knowledge of the secret key using said random number that has been input and the data received from said public key certificate obtainment device; and a second output unit implemented at least by the hardware and that outputs the proof and the item data used to identify the signer.

4. The signature system according to claim 1, wherein said signature device comprises:

hardware, including a processor;

a third input unit implemented at least by the hardware and that inputs the message, the revelation item set that represents the items to be revealed, the secret key, the public key certificate that includes the item data, and the infrastructure public key that includes the item key that is the element corresponding to each item of said item data;

a knowledge certification text generation unit implemented at least by the hardware and that generates a knowledge certification text about data excluding the revelation item data that are the item data that belong to said revelation item set using said secret key and said public key certificate that have been input; and a third output unit implemented at least by the hardware and that outputs both a selectively anonymous signature corresponding to said message and said revelation item data.

5. The signature system according to claim 1, wherein said signature verification device comprises:

hardware, including a processor;

a fourth input unit implemented at least by the hardware and that inputs the message, the revelation item set that represents the items to be revealed, the revelation item data that are the item data that belong to said revelation item set, the infrastructure public key that includes the item key that is the element corresponding to each item of the item data, and the selectively anonymous signature corresponding to said message;

a knowledge certification text verification unit implemented at least by the hardware and that verifies that the knowledge certification text about the data excluding said revelation item data is included in said selectively anonymous signature using said secret key and public key certificate that have been input and determines whether or not said selectively anonymous signature is a valid signature corresponding to said message; and a fourth output unit implemented at least by the hardware and that outputs a determined result performed by said knowledge certification text verification unit.

6. The signature system according to claim 1, wherein said tracing device comprises:

hardware, including a processor;

a fifth input unit implemented at least by the hardware and that inputs the infrastructure public key that includes the item key that is the element corresponding to each item of the item data, the selectively anonymous signature that is a selective signature corresponding to said message and that includes the encryption text of the part of the proof generated from the secret key, the secret key for tracing used to decrypt said encryption text, and a proof list used to identify the signer;

a decryption validity certification unit implemented at least by the hardware and that obtains the part of the proof generated from the secret key using said input secret key and selectively anonymous signature and compares the obtained part of the proof and said proof list so as to generate a decryption validity certification that is information that identifies said selectively anonymous signature; and a fifth output unit implemented at least by the hardware and that outputs the part of the proof and the decryption validity certification obtained by said decryption validity certification unit.

7. The signature system according to claim 1, wherein said selectively anonymous signature device has a knowledge certification unit implemented at least in hardware including a processor and that performs a certification process for the knowledge about the data excluding said revelation item data instead of said knowledge certification text generation unit such that said selectively anonymous signature device is structured as a selectively anonymous target authentication device, and wherein said selectively anonymous signature verification device has a knowledge verification unit implemented at least in hardware including a processor and that verifies that the knowledge about the data excluding said revelation item data is included in said selectively anonymous signature instead of said knowledge certification text verification unit such that said selectively anonymous signature verification device is structured as a selectively anonymous authentication device.

* * * * *